(12) United States Patent
Goebel et al.

(10) Patent No.: US 7,869,672 B2
(45) Date of Patent: Jan. 11, 2011

(54) OPTICAL ASSEMBLIES AND METHODS FOR FABRICATION OF OPTICAL ASSEMBLIES

(75) Inventors: Andreas Goebel, Mountain View, CA (US); Lawrence C. West, San Jose, CA (US); Gregory L. Wojcik, Ben Lomond, CA (US)

(73) Assignee: Applied Materials, Inc., Santa Clara, CA (US)

( * ) Notice: Subject to any disclaimer, the term of this patent is extended or adjusted under 35 U.S.C. 154(b) by 6 days.

(21) Appl. No.: 11/771,716

(22) Filed: Jun. 29, 2007

(65) Prior Publication Data

US 2008/0124084 A1 May 29, 2008

Related U.S. Application Data

(60) Provisional application No. 60/806,348, filed on Jun. 30, 2006.

(51) Int. Cl.
*G02B 6/28* (2006.01)
*G02B 6/12* (2006.01)
*G02B 6/26* (2006.01)
*G02B 6/34* (2006.01)
*G02B 6/42* (2006.01)
*G02B 5/18* (2006.01)
*H04J 14/00* (2006.01)
*H04J 14/02* (2006.01)

(52) U.S. Cl. .............................. 385/24; 385/14; 385/15; 385/37; 385/39; 359/569; 398/48; 398/87; 398/96

(58) Field of Classification Search ................... 385/24, 385/37; 398/84, 87
See application file for complete search history.

(56) References Cited

U.S. PATENT DOCUMENTS

| | | | | |
|---|---|---|---|---|
| 5,434,434 A * | 7/1995 | Kasahara et al. | ............... | 257/84 |
| 6,433,911 B1 * | 8/2002 | Chen et al. | ................... | 359/222 |
| 6,792,181 B2 * | 9/2004 | Sasaki | ......................... | 385/37 |
| 6,870,982 B1 * | 3/2005 | Maheshwari | ................ | 385/16 |
| 7,182,528 B2 * | 2/2007 | Mori | ............................ | 385/93 |
| 7,505,647 B2 | 3/2009 | Goebel et al. | | |
| 2003/0128925 A1 * | 7/2003 | Wickman | ..................... | 385/37 |
| 2003/0223681 A1 * | 12/2003 | Frick | ............................ | 385/23 |
| 2005/0129404 A1 * | 6/2005 | Kim et al. | ..................... | 398/84 |

\* cited by examiner

*Primary Examiner*—Uyen-Chau N Le
*Assistant Examiner*—Kajli Prince
(74) *Attorney, Agent, or Firm*—Townsend and Townsend and Crew LLP

(57) ABSTRACT

An optical assembly is formed with a silicon substrate having a first surface and a second surface confronting the first surface. A reflective coating is formed over the first surface. Multiple diffraction gratings are formed integrally within the second surface of the silicon substrate. An optical absorber is formed over the second surface between the diffraction gratings.

16 Claims, 6 Drawing Sheets

OPTICAL ASSEMBLIES AND METHODS FOR FABRICATION OF OPTICAL ASSEMBLIES

CROSS REFERENCE TO RELATED APPLICATION

This application is a nonprovisional of, and claims the benefit of the filing date of, U.S. Prov. Pat. Appl. No. 60/806,348, entitled "MULTIPLEXED OPTICAL SUBASSEMBLY," filed Jun. 30, 2006, the entire disclosure of which is incorporated herein by reference for all purposes.

This application is related to concurrently filed, commonly assigned U.S. patent application Ser. No. 11/771,760, entitled "METHOD AND APPARATUS FOR DEMULTIPLEXING OPTICAL SIGNALS IN A PASSIVE OPTICAL NETWORK," by Andreas Goebel et al., the entire disclosure of which is incorporated herein by reference for all purposes.

BACKGROUND OF THE INVENTION

This application relates generally to optical routing. More specifically, this application relates to passive optical networks.

Fiber-optic telecommunications systems are currently deploying wavelength division multiplexing ("WDM") as a mechanism for expanding the capacity of new and existing optical fiber systems. In WDM, multiple wavelengths of radiation simultaneously transport information through a single optical fiber. Each wavelength operates as an individual channel carrying a stream of data.

A passive optical network ("PON") is a communications architecture in which each single optical fiber transmits multiple channels of information in this way as distinct wavelengths of radiation. The network is termed "passive" because the wavelengths are combined (multiplexed) and separated (demultiplexed) using wavelength-selective splitters or couplers rather than active switching or variable routing components. One example of a PON is the distribution of video (television, cable TV, and/or video downloads), analog or digital telephone (local, long-distance, and/or VoIP), and digital computer data (Internet or network connectivity) from a service provider to a multiplicity of subscribers via optical fiber-to-the-premises ("FTTP" or "FTTx") connections. At or near each subscriber/user location along such a PON, it is generally necessary to receive and demultiplex two or three incoming optical signals from a single optical fiber. This may be done at relatively wide wavelength spacing compared with the dense wavelength division multiplexing that is used for long-haul transmissions. At least one optical signal is multiplexed and transmitted back into the optical fiber at a distinct wavelength.

For example, in one implementation, downstream traffic is provided on a 1490-nm channel and upstream traffic is provided on a 1310-nm channel. In another implementation, an additional 1550-nm band is allocated for downstream rf video traffic.

There are a number of different PON standards in existence. The ITU-T G.983 standard defines standards for ATM PONs ("APON") and broadband PONs ("BPON"). These represent the earliest PON standards, with BPON building on the APON standard to provide support for wavelength division multiplexing as well as better upstream bandwidth allocation. There has been more recent interest in the ITU-T G.984 standard, which supports higher rates and enhanced security as a further evolution of the BPON standard. In addition, the IEEE 802.3ah standard provides a standard for using Ethernet for packet data. Emerging approaches for providing customers with the "triple-play" of services described above over a common system or network require data-transfer rates in the gigabit/second (Gb/s) range or higher, which can be most easily achieved using optical rather than electronic ("copper") transmission lines, leading to the nomenclature "GPON" for gigabit passive optical networks.

In implementing any of these various PONs, there is a general need for structures to manage the transmission of the different signals, both downstream and upstream. Current implementations suffer from a number of deficiencies. For example, persistent concerns with structures that are used exist in the isolation of the different wavelengths, the need to control the absorption of stray radiation, and the cost of fabrication.

BRIEF SUMMARY OF THE INVENTION

Embodiments of the invention provide methods and structures for directing radiation. Embodiments of the invention simultaneously address multiple problems that persist with PON structures currently used. This is achieved in embodiments of the invention by using low-cost silicon fabrication methods that provide high precision to produce a structure that effectively manages wavelength isolation and stray radiation to provide efficient multiplexing and demultiplexing operations. The use of low-cost small-silicon-chip processes permits the use of small beams in tightly controlled free space instead of the use of waveguides, providing improved insertion loss and cost.

The structure makes use of grating in reflective mode for efficiency and may be produced with a low etch depth for fabrication. A focal spot may then be used that is large enough to operate the PON efficiently, but small enough to separate two beams with dispersion from the grating. The structure provides high absorption of radiation and the size of the grating coupling discriminates the wavelengths, thereby allowing the use of larger aperture detectors for improved tolerance in placement. Beams may be coupled in and out of the chip at near normal incidence for improved optical performance, especially for polarization and placement.

The use of silicon fabrication methods allows the parallel surfaces of the silicon wafers to be used to provide predictable beam angles. Standard chip-assembly techniques using low-cost passive pick-and-place tools greatly improve the fabrication efficiency over other techniques.

The result is a solution to the issue of producing PONs that uses small beams in tightly controlled free space instead of waveguides to provide improved insertion loss and cost. A wavelength separation of 60-180 nm can be well achieved with a 100-µm-diameter spacing, with about a 1-µm pitch. Merely by way of example, a focal spot diameter of 25 µm has a focus range of about 1 mm in silicon, allowing spots to be well discriminated within the geometry of the structure.

These and other embodiments of the present invention, as well as its advantages and features are described in more detail in conjunction with the text below and attached figures.

DETAILED DESCRIPTION OF THE INVENTION

Embodiments of the invention provide optical assemblies that may be used in directing radiation. Such optical assemblies find particular application in applications in which the radiation is directed through a PON, although they may be amenable to uses in other applications also. Rather than adopt a conventional approach to providing such an optical assembly, the inventors have applied their experience with semiconductor-processing techniques to develop a structure that uses a semiconductor substrate to provide a quasi-free-space optical platform. Structural elements of an optical subassembly are fabricated using semiconductor lithographic techniques, providing a structure that may be produced at a cost significantly lower than structures produced using more conventional techniques.

In certain embodiments, the fabrication techniques advantageously exploit the availability of pick-and-place methods for accurate fabrication of structures. The use of semiconductor-processing techniques in this way results in a structure that has good strength, optical stiffness and humidity control.

Figure 1:
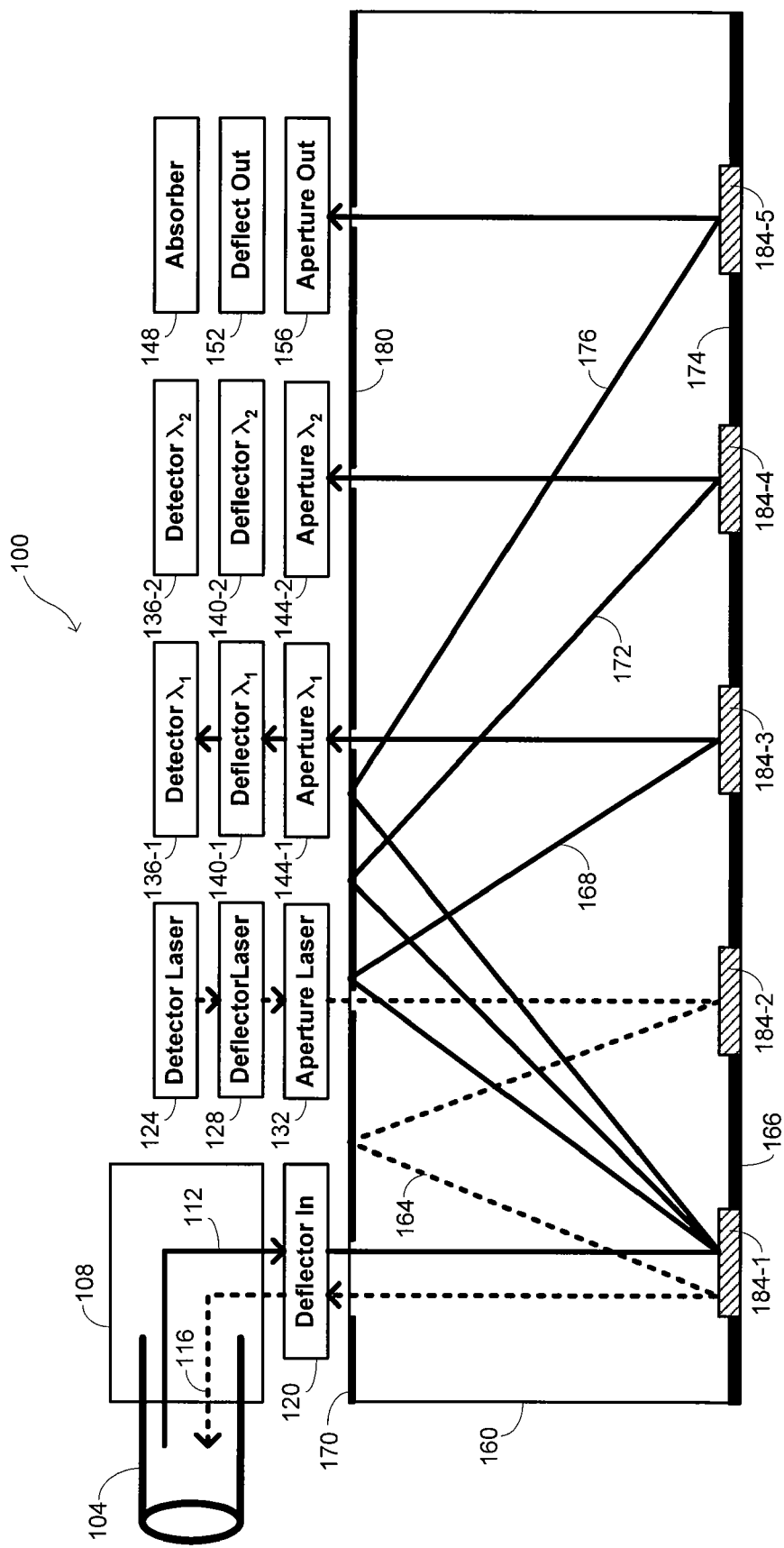
FIG. 1 provides a schematic illustration of an optical assembly in accordance with embodiments of the invention.

A typical structure in one embodiment is shown with the schematic diagram of FIG. 1. In this illustration, the optical assembly is identified by reference number 100 and comprises an optical subassembly 160, which may be produced using the semiconductor lithographic techniques described in greater detail below. The optical assembly 100 includes a number of additional elements in addition to the optical subassembly 160 that are used principally to provide radiation to and receive radiation from the subassembly 160, with the subassembly 160 performing the optical routing functions.

Radiation may be provided to the optical subassembly from two sources, corresponding to sources for downstream and upstream traffic. Downstream traffic 112 is provided by an optical fiber 104 that is coupled to an optical coupler 108, which expands the size of the beam 112 on which the traffic is carried and collimates it for delivery to the subassembly 160. The optical coupler 108 may be mounted in different positions in different embodiments, with it being surface mounted in some embodiments. The radiation is directed through a deflector 120 into the subassembly 160 through a first surface 166 and propagates to one of a plurality of diffraction gratings 184 formed integrally with a second surface 170 of the subassembly 160. The second surface 170 is provided opposite the first surface 166 and may be substantially parallel to the first surface 166.

Radiation 112 from the optical coupler 108 is directed substantially normally to the first surface 166 and undergoes angular separation by its encounter with the first diffraction grating. Different wavelength components of the radiation accordingly propagate differently within the subassembly 160. For instance, a first path 168 may be followed by a first wavelength component, being directed to another of the diffraction gratings 184-3. This diffraction grating 184-3 has the effect of reversing the angular redirection of the single wavelength component so that this portion of the signal is now again directed substantially perpendicular to the first surface to a first detector 136-1. Such propagation is again substantially normal to the first surface 166 and may proceed through a first aperture 144-1 and deflector 140-1.

Similarly, a second path 172 may be followed by a second wavelength component to another of the diffraction gratings 184-4. This diffraction grating 184-4 also has the effect of removing the angular separation to direct this wavelength component substantially normally to the first surface 166 to a second detector 136-2. Again, the propagation may proceed through a second aperture 144-2 and a second deflector 140-2 before encountering the detector 136-2.

Other radiation separated angularly by the first diffraction grating 184-1 may propagate along a further path 176 in still a similar fashion, with its angular separation being removed by still another diffraction grating 184-5. This radiation is collected by an optical absorber 148 after propagating substantially normally through the first surface 166, perhaps after encountering a further aperture 156 and deflector 152. Collection of this additional radiation by the absorber acts to avoid interference with the other signals by preventing stray radiation from being propagated within the subassembly to be received by either of the wavelength detectors 136.

As shown in the drawing, each of the paths 168, 172, and 176 followed by the separated radiation undergoes at least one reflection from the first surface 166 within the subassembly 160. In the illustrated embodiment, each path 168, 172, and 176 undergoes a single reflection, but other embodiments may provide for multiple reflections from the first surface 166. To improve the efficiency of coupling the radiation from the downstream beam to the different detectors 136, the first surface 166 may be covered with a highly reflective coating 180 such as a metal. The coating 180 ensures that losses due to the reflection are minimized and is formed in regions of the first surface 166 where reflections of the signals are to occur according to the geometry of the subassembly and the optical characteristics of the diffraction gratings 184.

In converse fashion, the diffraction gratings may be patterned for high reflection, such as by including materials in their fabrication that increase reflectivity. The second surface 170 may also be covered between the diffraction gratings with an absorber material 174. This advantageously minimizes the level of crosstalk between the different wavelength channels by absorbing any stray radiation from a particular channel before it can follow a path to an unintended detector 136. Specifically, the different angular direction of propagation of the different wavelength channels permits the detectors to be positioned so that the Gaussian overlay of the different signals is minimized. For instance, with two downstream channels at 1490 nm and 1550 nm, the configuration of the structure causes the input of the 1490-nm beam detected by the 1550-nm detector to be minimized and for the input of the 1550-nm beam detected by the 1490-nm detector to be minimized. The additional inclusion of the absorber 174 further reduces the potential for crosstalk.

The upstream traffic operates in a generally similar manner but propagates in the opposite direction. The upstream radiation source is shown in the drawing as a laser 124, although other types of sources may be used in alternative embodiments. Radiation is directed from the laser 124 into the subassembly 160 substantially normally to the first surface 166 towards one of the diffraction gratings 184-2. In some instances, the radiation may pass through a deflector 128 and aperture 132. The radiation is angularly redirected by the diffraction grating 184-2 along path 164 to the first diffraction grating 184-1, which introduces a complementary angular redirection to propagate the radiation upstream into the optical coupler 108 where it is integrated as an upstream signal 116 in the optical fiber 104.

There are a number of aspects of the structure shown in FIG. 1. The optical path is folded, making the overall size of the chip smaller. As a consequence, thermal expansion of the system does not significantly affect the coupling. Coupling efficiency is also effectively accommodated with the expansion of the beam size by the optical coupler 108. The desired coupling efficiency can still be achieved when the beam is expanded within tolerances that are 5-25 times as large as for an unexpanded beam.

In some embodiments, the subassembly is fabricated with a silicon substrate, although other materials may be used in other embodiments. It is generally desirable that the substrate material be substantially transparent at the wavelengths used by the various optical signals. For example, when downstream wavelengths are 1490 nm and/or 1550 nm and the upstream wavelength is 1310 nm, the substrate is preferably substantially transparent at infrared wavelengths. Other examples of materials that may be used include sapphire and glass. Notably, silicon has a relatively large refractive index, being n=3.5 as compared with n=1.5 for glass. The higher refractive index makes the radiation travel more slowly within the material so that the gratings may be made smaller.

Figure 2:
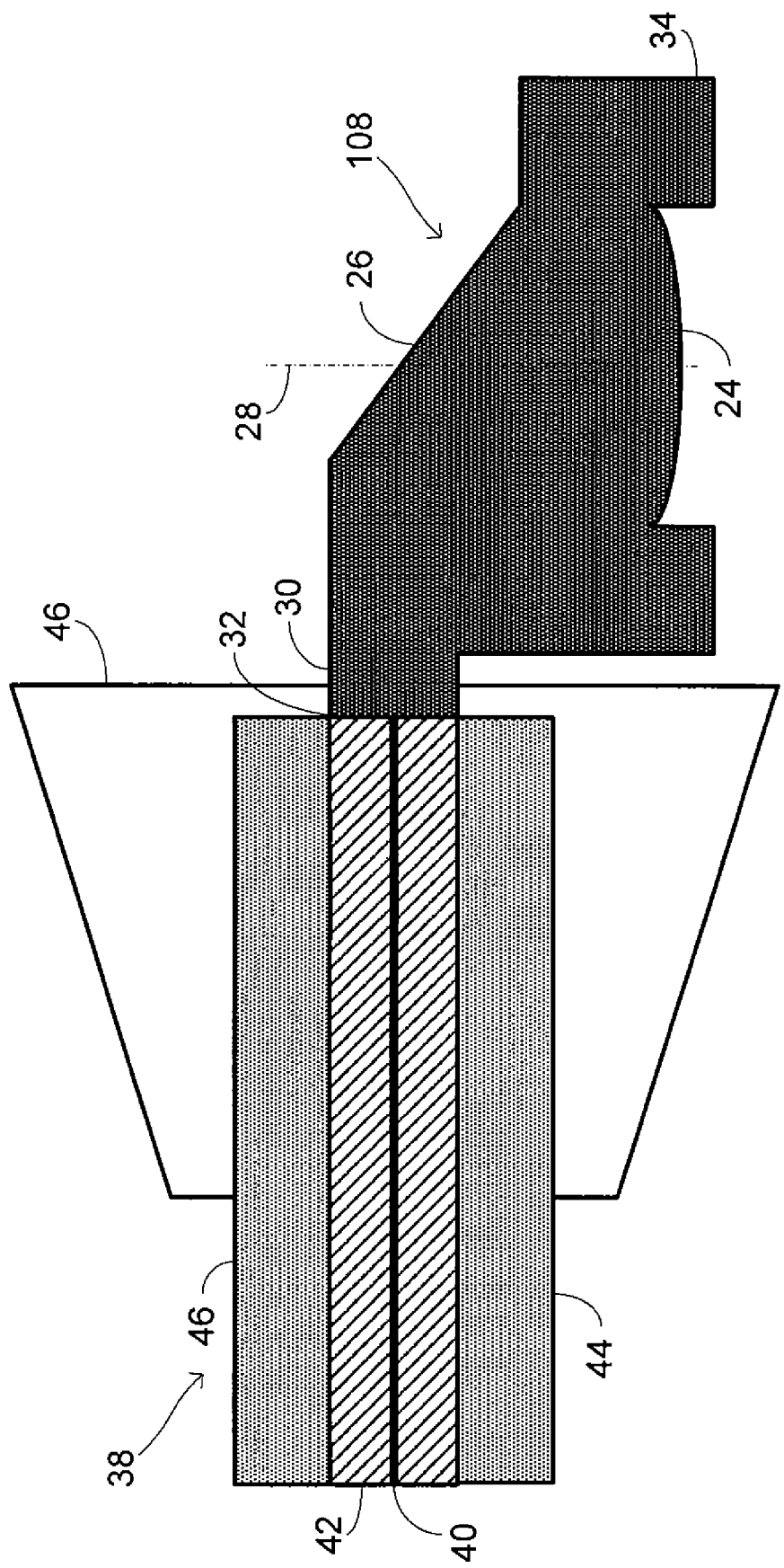
FIG. 2 provides a schematic illustration of a structure that may be used for an optical coupler in some embodiments.

FIG. 2 provides an illustration of a structure that may be used for the optical coupler 108 in some embodiments. This configuration is especially suitable for embodiments in which the optical coupler comprises a surface-mounted optical coupler. In such an embodiment, the optical coupler 108 comprises an integrally fabricated structure that includes a collimating lens 24, a mirrored surface 26 angled 45° relative to the optical axis 28 of the collimating lens 24, a short rod-shaped extension 30 that has a flat optical surface 32 at its exposed end, and a cylindrical shaped support or tube extension 34 that supports and aligns the optical coupler against a chip. Butted against the flat surface of the extension 30 is an optical fiber pigtail 38 that characteristically includes a fiber core 40 surrounded by fiber cladding 42, which is in turn surrounded by a fiber buffer layer 44 that protects the inner structure. A polymer boot 46 surrounds the end of the optical fiber pigtail 38 and part of extension 30 and serves both to provided a mechanism of anchoring the assembly to an extension arm of a chip carrier to protect the optical fibre from being damaged during handling. When the optical coupler 108 is mounted on the backside of a chip, it aligns its collimating lens 24 with a focusing lens and maintains them at a predetermined distance from each other with an intermediate air gap separating them.

Figure 3:
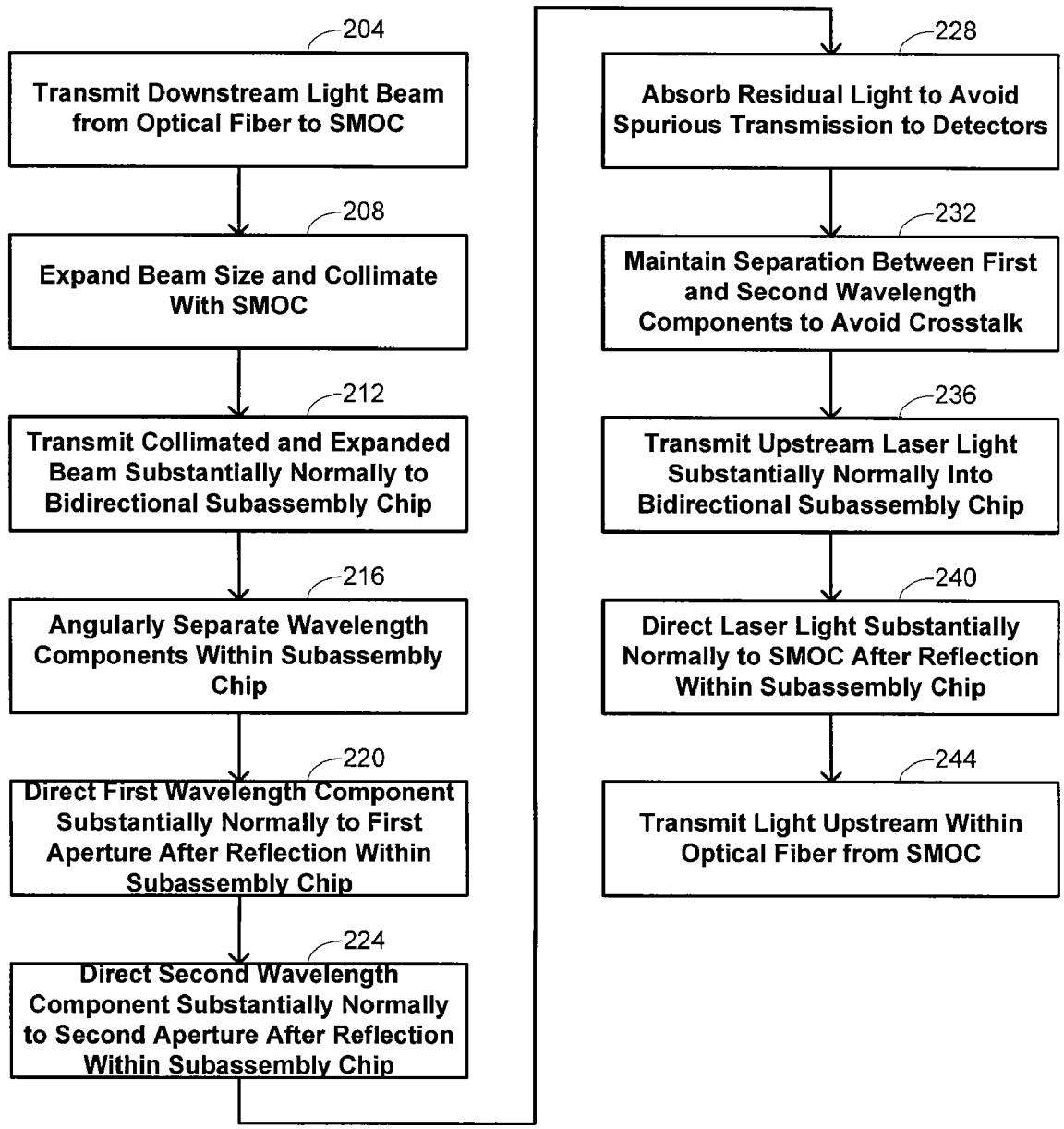
FIG. 3 is a flow diagram that summarizes methods of directing radiation in accordance with embodiments of the invention.

FIG. 3 provides a flow diagram that summarizes methods of directing radiation in accordance with embodiments of the invention. At block 204, a radiation beam is transmitted downstream from an optical fiber to an optical coupler. The expansion of the beam size and its collimation with the optical coupler are indicated at block 208. The collimated and expanded beam is transmitted at block 212 to the subassembly chip substantially normally to the first surface 166. Angular separation of the wavelength components within the subassembly chip occurs at block 216, permitting the first wavelength component to be directed substantially normally to the first surface 166 after reflection within the subassembly chip at block 220. When the radiation beam comprises a plurality of wavelength components, the second wavelength component is similarly directed substantially normally to the first surface 166 after reflection within the chip at block 224.

The absorption of radiation to avoid spurious transmission to the wavelength detectors is noted at block 228, with separation being maintained between the first and second wavelength components at block 232 to avoid crosstalk. While blocks 204-232 generally indicate how the downstream transmission of signals is effected, upstream transmission of laser radiation is indicated at blocks 236-248. The laser radiation is transmitted into the subassembly chip at block 236, again substantially normally to the first surface 166. After reflection within the chip, it is directed substantially normally at block 240 to the optical coupler. Coupling of the radiation into an optical fiber at block 244 allows the upstream transmission of the signal.

Figure 4:
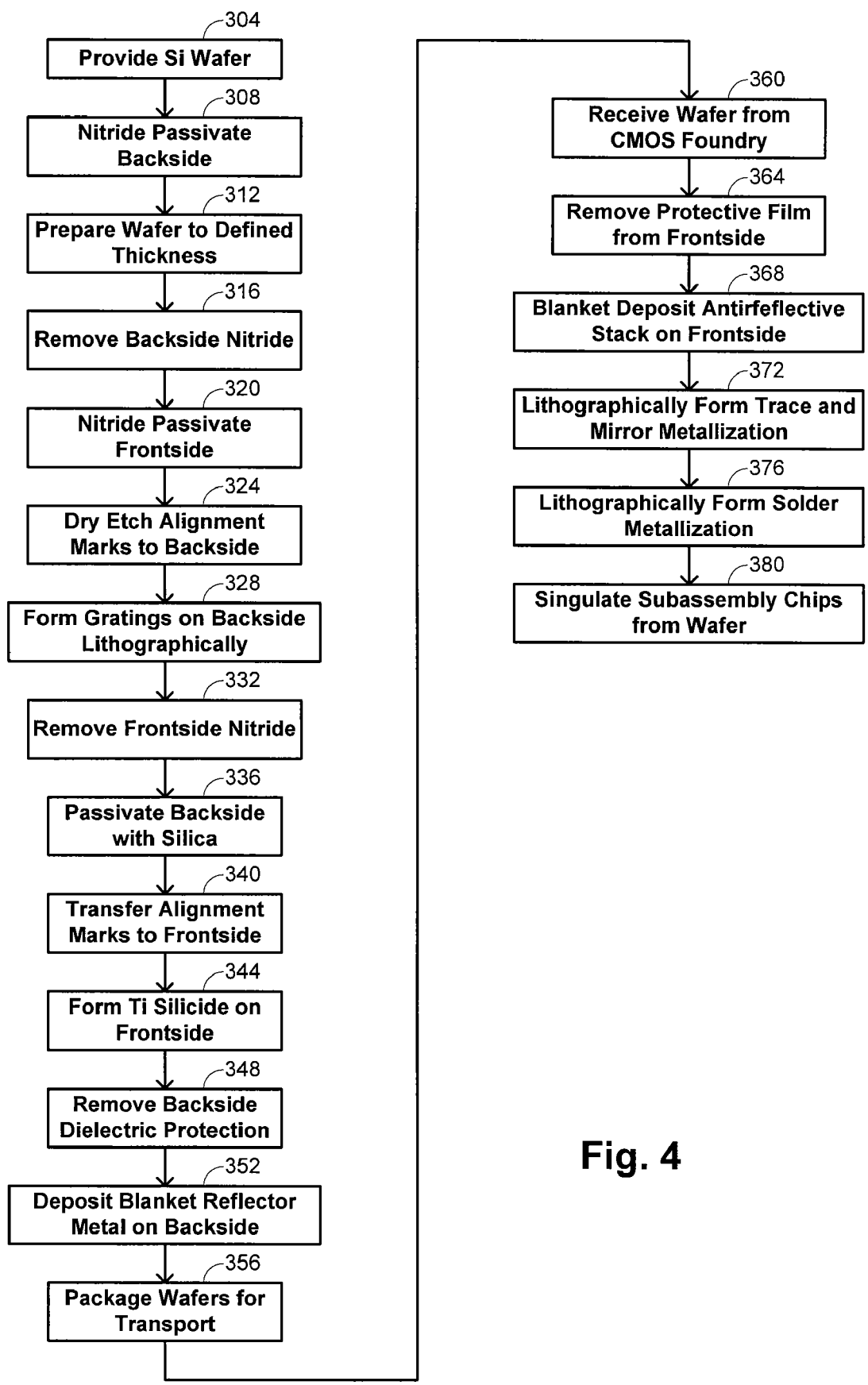
FIG. 4 is a flow diagram that summarizes methods of fabricating an optical subassembly in accordance with embodiments of the invention.

There are a variety of different ways in which the optical subassembly may be manufactured in different embodiments. FIG. 4 provides a flow diagram that illustrates one such process. FIG. 4 is organized by separately illustrating steps performed at different locations, as might be done when a portion of the fabrication process is performed at a CMOS foundry and a remainder of the process is performed at a thin-film house. The left column in the drawing corresponds to those steps advantageously performed at the CMOS foundry and the right column corresponds to those steps advantageously performed at the thin-film house. This organization of the steps is not intended to be limiting. In other embodiments, all of the steps might be performed at a single location or the number of locations at which the process is completed might be greater than two.

The method in this embodiment begins at block 304 with a silicon wafer, whose backside is nitride passivated at block 308. For instance, the wafer might comprise a wafer having an 8-inch diameter with a thickness of 725±10 μm, polished on both sides. The nitride passivation may involve deposition of a thickness of approximately 1000 Å in a particular implementation. The wafer is prepared to have a defined thickness at block 312. This may be accomplished by measuring the wafer thickness and using a combination of grinding and polishing to achieve the desired thickness. In one specific embodiment, the wafer is prepared with a thickness of 700±2 μm. Particles may be removed by a subsequent cleaning and degreasing of the thinned wafer. At block 316, the backside nitride may be removed. This may be followed by nitride passivation of the frontside of the wafer at block 320. Alignment marks may be provided to the wafer backside using dry-etch techniques at block 324.

Such preliminary preparations permit the lithographic formation of the diffraction gratings on the backside at block 328. This may be accomplished, for example, by using a combination of depositing photoresist, and producing trenches by application of photolithographic and etching techniques as known in the art. A plurality of gratings may be formed in this way, the actual number perhaps depending on the specific application for the subassembly.

This prepatory work may be followed by removing the frontside nitride at block 332, followed by a silica passivation deposition on the backside at block 336. The deposition may proceed to produce a silica thickness in a particular embodiment of about 1000 Å. Alignment marks are transferred to the wafer frontside at block 340. This is followed by the formation of Ti silicide on the frontside at block 344. A blanket of $SiO_2$ may be deposited on the frontside, reaching a thickness of about 5000 Å in one embodiment. The $SiO_2$ is patterned for the silicide pattern and etched, using the silicon substrate as a stop. Titanium is blanket sputtered on the front side, with thermal annealing being used to produce the Ti silicide. A few minutes of annealing at a temperature of about 700° C. is sufficient. Other annealing techniques may be used in certain alternative embodiments. A wet etch may be used to remove residual titanium metal that is not in contact with the silicon substrate, followed by deposition of SiO$_2$ on the frontside. This additional deposition provides protection for the chuck from titanium and silicide contamination.

Backside dielectric protection may be removed at block 348, with blanket deposition of reflector metal then taking place on the backside at block 352. This completes the partial preparation at the CMOS foundry so that the wafers may be packaged for transport at block 356.

Subsequent processing the wafers at the thin-film house may begin at block 360 with receipt of a wafer from the CMOS foundry. Using the specific example discussed above, such an incoming wafer has a diameter of about eight inches and a thickness of 700±2 μm. The frontside is protective coated with an oxide or nitride over optical-quality silicon polished windows. The backside is coated with a reflector metal.

At block 364, the processing of such a wafer continues by removing the protective film from the frontside. An antireflective stack is blanket deposited on the frontside at block 368. For instance, a broadband antireflective coating that covers an infrared region between 1310 and 1550 nm may be deposited, followed by a SiO$_2$ top layer. at block 372, trace and mirror metallization are formed lithographically. A multilayer metallization may be used in one embodiment, such as when a Ti/Ni/Au structure is used. Formation of the metallization layer may use photoresist and contact-lithography techniques, coupled with an acetone lift-off pattern. The metallization is compatible for wire bonding. At block 376, solder metallization is formed lithographically using a similar technique. Again, a multilayer structure may be used, such as by using a Cr/NiV/AuSn structure in one embodiment. A suitable solder stack thickness in an embodiment is about 0.5 μm. A gold oxidation protection cap may sometimes be applied, perhaps depending on the thickness of the solder stack.

The production of the subassembly chips is essentially complete at this stage. The chips are accordingly singulated from the wafer at block 380. When fabrication takes place in two facilities, there is generally no crossover of wafer processing between the facilities, i.e. no resist deposit and processing crossover, although this is not a requirement of the invention. In such instances, all processes and quality control are the sole ownership of either the CMOS foundry or the thin-film house. In addition, wafers generally do not re-enter the CMOS foundry after processing in the thin-film house. This alleviates issues related to wafer cleaning of particulates and materials contamination at the CMOS foundry. This accommodates the fact that the thin-film house may have lower cleanroom controls than the CMOS foundry. It is generally the case that thin-film houses do not have automated wafer handling and processing capabilities. Implementation of automated wafer handling is thus limited by small production volumes rather than by process compatibility.

Figure 5:
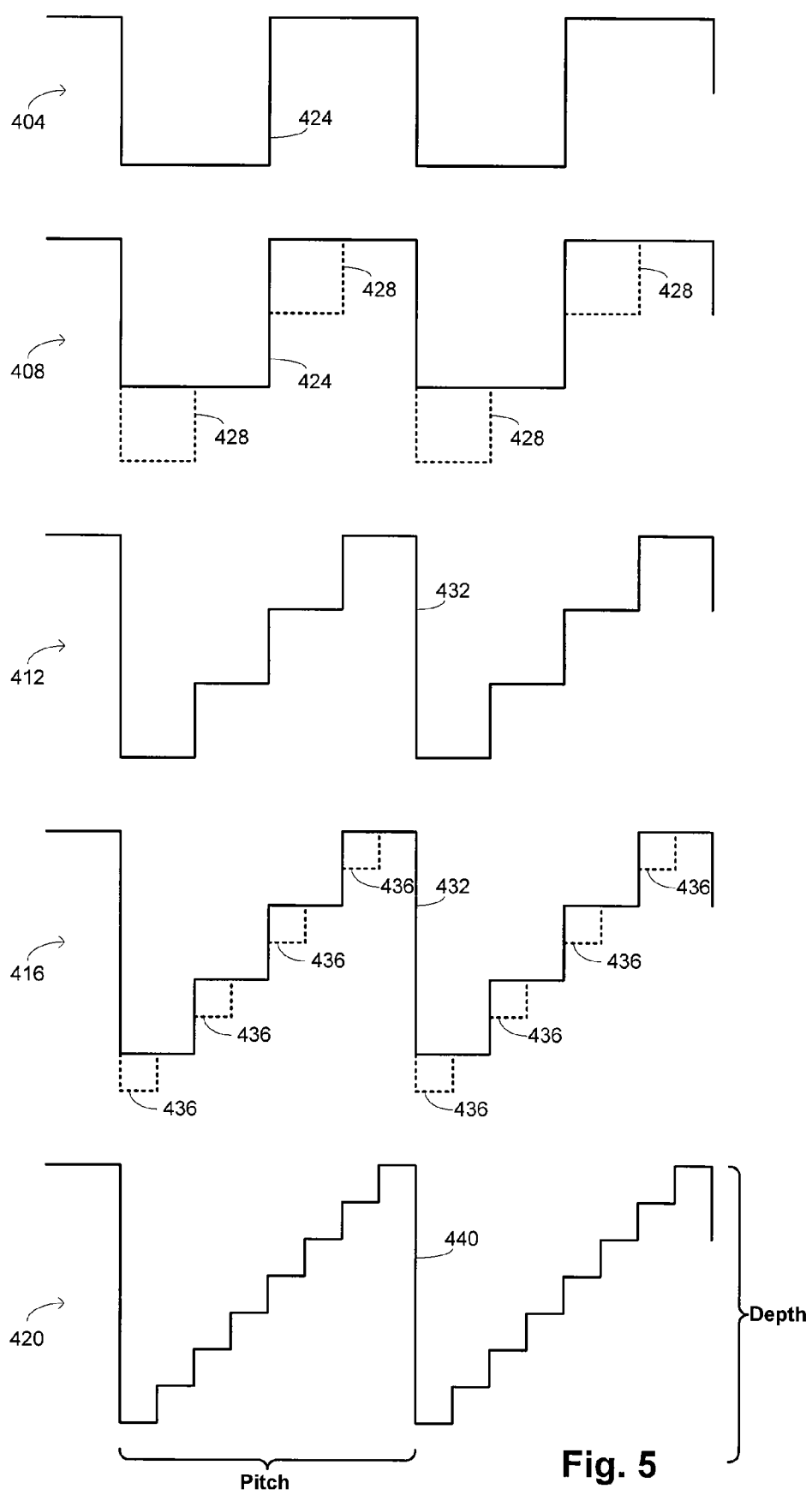
FIG. 5 is a diagram illustrating intermediate stages in the fabrication of a diffraction grating integral with a surface of an optical subassembly.

There are a variety of different structures that may be used for the diffraction gratings. In one embodiment, the gratings are produced using a binary optics technique illustrated in FIG. 5. This technique forms initial trenches at the pitch of the final grating and progressively introduces additional features, as may be understood more clearly with reference to the drawing. An initially flat substrate may be formed into a two-level structure 404 by etching trenches 428 at the grating pitch. This process is repeated at half the pitch as indicated with structure 408. Trenches 428 at half the pitch are formed by using lithographic techniques and are etched to a depth half that of the initial trenches. This produces a four-level structure 412 having profile 432. The process is repeated again at a quarter of the pitch as indicated with structure 416. Trenches 436 at a quarter the pitch are formed by using lithographic techniques and are etched to a depth a quarter that of the initial trenches. This produces an eight-level structure 420 having profile 440.

The result of this type of processing produces a diffraction-grating structure having the same initial pitch as the first structure 404, but having a total depth that is the sum of the depths of the trenches etched at each processing level. In the example of an eight-level structure, the total depth is $(1+\frac{1}{2}+\frac{1}{4})=\frac{7}{4}$ of the initial trench depth. Even with such a general type of grating structure, there are thus at least three parameters that may potentially by varied to alter the optical characteristics of the structure: the number of levels, the total depth, and the pitch (or some surrogate for these three independent parameters).

Figure 6:
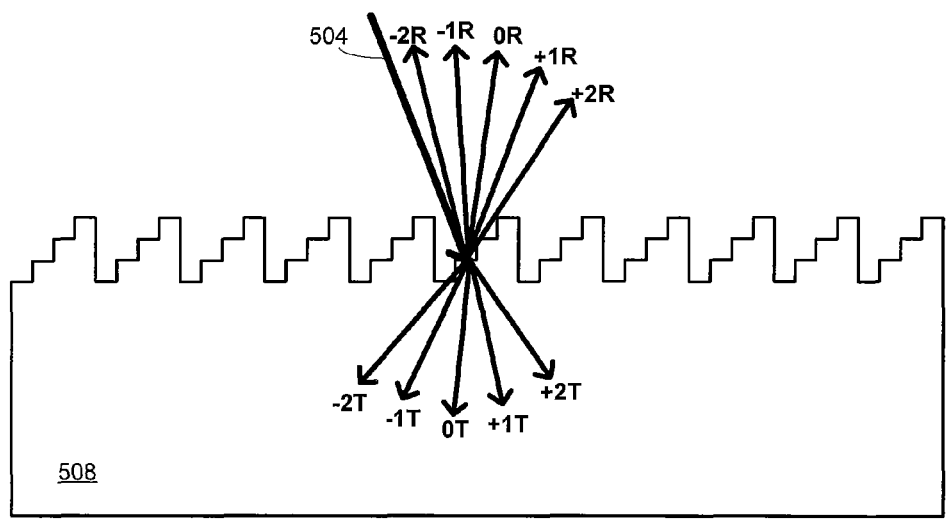
FIG. 6 is a diagram defining different orders of reflective and transmissive diffraction from a diffraction grating of the type produced using the technique illustrated in FIG. 5.

In determining preferred values for these parameters, one optical characteristic that is relevant is the polarization-dependent loss of the grating. This is a characteristic that is frequently of concern in evaluating grating performance, for a variety of different grating designs. The inventors have accordingly performed simulations to evaluate the polarization characteristics of different gratings in which these parameters are varied. FIG. 6 shows schematically the effect of a grating 508 on an incident beam 504. A portion of the incident radiation 504 is reflected by the grating 508 and a portion is transmitted. The reflected and transmitted radiation are shown in terms of a spectral decomposition into different transmitted ("T") and reflected ("R") orders. In certain embodiments, an eight-level grating is used as a cost-effective midpoint between fewer numbers of levels that provide workable results and higher numbers of levels that may significantly increase production costs. But gratings with different levels may be used effectively in a number of embodiments.

Figure 7:
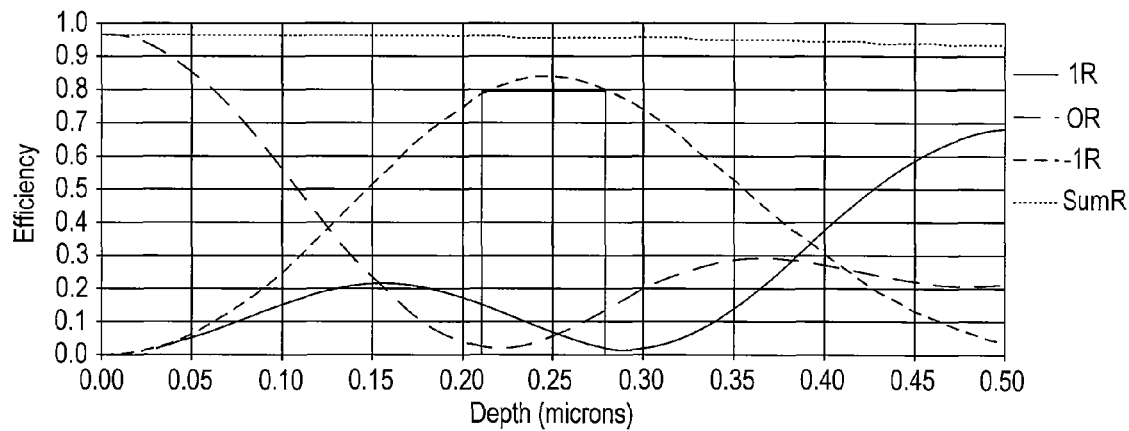
FIG. 7 provides graphs demonstrating a comparison of diffraction efficiencies for different diffraction-grating characteristics.
Figure 7:
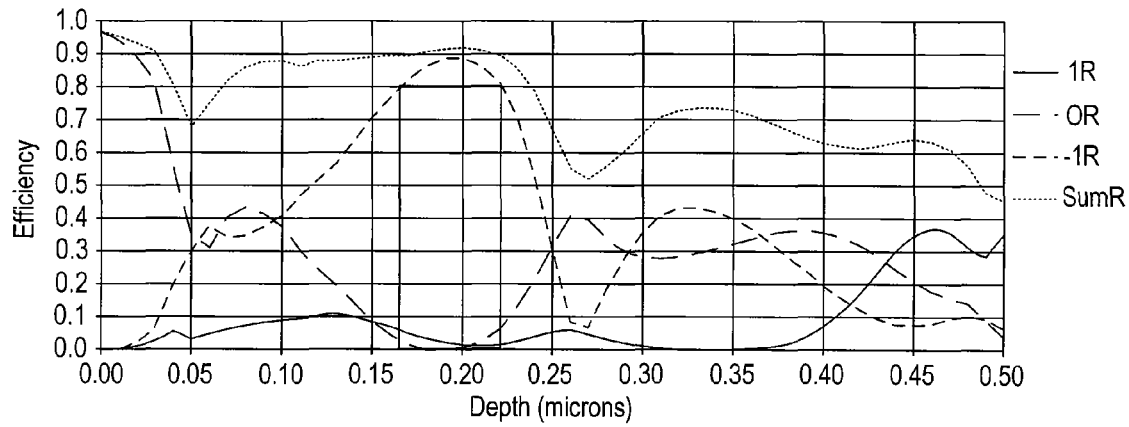

One set of results is shown in FIG. 7 for an eight-level diffraction grating having a 0.8 μm pitch when radiation having a wavelength of 1490 nm is incident. The top set of results shows the efficiency for TE polarizations, with different curves in the drawing corresponding to different transmitted and reflected orders and showing how the efficiency varies with grating depth. The bottom set of results similarly shows the efficiency for TM polarizations, with different curves again corresponding to different transmitted and reflected orders. In each of the two drawings, a box is drawn to indicate the depth region over which the efficiency is at least 80%.

It is preferable to have structural characteristics of the grating that simultaneously maximize the TE and TM polarization efficiencies. This is frequently impossible to achieve, but there are circumstances when both polarization efficiencies can be achieved greater than some acceptable threshold value, such as greater than 70%, greater than 75%, greater than 80%, greater than 85%, greater than 90%, or greater than 95%. In the example, the TE diffraction efficiency is greater than 80% when the grating depth is between about 0.21 and 0.28 μm and the TM diffraction efficiency is greater than 80% when the grating depth is between about 0.17 and 0.22 μm. This provides a window between about 0.21 and 0.22 μm where the diffraction efficiencies for both polarizations may be simultaneously achieved greater than 80%.

Having fully described several embodiments of the present invention, many other equivalents or alternative embodiments of the present invention will be apparent to those skilled in the art. The scope of the invention should, therefore, be determined not with reference to the above description, but instead should be determined with reference to the appended claims along with their full scope of equivalents.

What is claimed is:

1. An optical assembly comprising:
 a silicon substrate having a first surface and a second surface confronting the first surface;
 a reflective coating formed over at least part of the first surface;
 a plurality of diffraction gratings etched into the second surface of the silicon substrate;
 an optical absorber formed over the second surface between the diffraction gratings; and
 a plurality of radiation detectors.

2. The optical assembly recited in claim 1 wherein the plurality of diffraction gratings comprises at least three diffraction gratings.

3. The optical assembly recited in claim 1 further comprising a detector disposed to receive radiation from the silicon substrate at a point on the first surface not covered by the reflective coating.

4. The optical assembly recited in claim 1 wherein at least one of the plurality of detectors is disposed to receive the radiation along a path from one of the diffraction gratings, wherein the path is substantially normal to the first surface.

5. The optical assembly recited in claim 1 further comprising a beam-expanding collimating optical coupler disposed to direct radiation downstream from an optical fiber into the silicon substrate along a first path to one of the diffraction gratings, wherein the first path is substantially normal to the first surface.

6. The optical assembly recited in claim 5 further comprising a radiation source disposed to direct radiation into the silicon substrate along a second path to the one of the diffraction gratings and upstream through the optical fiber, wherein the second path includes a segment that is substantially normal to the first surface.

7. The optical assembly recited in claim 1 wherein each of the plurality of diffractive elements comprises a plurality of levels within each period of the each of the plurality of diffractive elements.

8. The optical assembly recited in claim 7 wherein the number of levels is a power of two greater than two.

9. The optical assembly recited in claim 1 further comprising an antireflective coating formed over each of the plurality of diffraction gratings.

10. The optical assembly recited in claim 1 further comprising an aperture positioned along each path of radiation from one of the diffraction gratings to one of the detectors.

11. A method of forming an optical subassembly, the method comprising:
 etching a plurality of diffraction gratings into a first surface of a silicon substrate;
 forming an optical absorber over the first surface between the diffraction gratings; and
 forming a reflective coating over a second surface of the silicon substrate confronting the first surface.

12. The method recited in claim 11 wherein etching the plurality of diffraction gratings comprises forming a plurality of trenches in sequence, each trench formed in a level of the sequence having approximately half a width and half a depth of each trench formed in an immediately prior level of the sequence.

13. The method recited in claim 11 wherein forming the reflective coating comprises leaving gaps in the reflective coating over the second surface through which radiation within the optical subassembly may be coupled with a device external to the optical subassembly.

14. The method recited in claim 11 further comprising forming an antireflective coating over each of the plurality of diffraction gratings.

15. The method recited in claim 14 wherein the antireflective coating comprises a broadband antireflective coating antireflective over a wavelength range that includes 1310-1550 nm.

16. The method recited in claim 11 wherein the plurality of diffraction gratings comprises at least three diffraction gratings.

* * * * *